US007004114B2

(12) United States Patent
Hippensteel

(10) Patent No.: US 7,004,114 B2
(45) Date of Patent: Feb. 28, 2006

(54) ANIMAL RESTRAINT APPARATUS WITH ELEVATED LEASH ATTACHMENT

(76) Inventor: Joseph B. Hippensteel, 1109 S. Plaza Way #314, Flagstaff, AZ (US) 86001

( * ) Notice: Subject to any disclaimer, the term of this patent is extended or adjusted under 35 U.S.C. 154(b) by 0 days.

(21) Appl. No.: 10/152,199

(22) Filed: May 20, 2002

(65) Prior Publication Data

US 2003/0066494 A1    Apr. 10, 2003

Related U.S. Application Data

(60) Provisional application No. 60/328,522, filed on Oct. 9, 2001.

(51) Int. Cl.
*A01K 27/00* (2006.01)
(52) U.S. Cl. ...................... 119/856; 119/792
(58) Field of Classification Search ............... 119/792, 119/856, 725, 497, 787, 791
See application file for complete search history.

(56) References Cited

U.S. PATENT DOCUMENTS

| 4,328,767 A | 5/1982 | Peterson |
| 4,834,027 A | 5/1989 | Meyer |
| 4,879,972 A | 11/1989 | Crowe et al. |
| 5,199,383 A * | 4/1993 | Lagana ................ 119/858 |
| 5,503,113 A * | 4/1996 | Knight ................ 119/856 |
| 5,531,187 A * | 7/1996 | Ward ................ 119/856 |
| 5,551,379 A | 9/1996 | Hart |
| 5,676,093 A * | 10/1997 | Sporn ................ 119/792 |
| 5,732,659 A | 3/1998 | Wiggins |
| 5,732,662 A | 3/1998 | Jacobsen |
| 5,740,764 A | 4/1998 | Jacobsen |
| 5,934,224 A * | 8/1999 | Sporn ................ 119/792 |
| 6,167,844 B1 * | 1/2001 | Cantrell et al. ........ 119/856 |
| 6,314,915 B1 * | 11/2001 | Pope et al. ............ 119/712 |
| 6,450,130 B1 * | 9/2002 | Goldberg ............ 119/792 |
| 6,463,888 B1 * | 10/2002 | Clark ................ 119/856 |

FOREIGN PATENT DOCUMENTS

GB         2201874 A  *  9/1988

\* cited by examiner

*Primary Examiner*—Robert P. Swiatek
(74) *Attorney, Agent, or Firm*—Alston & Bird LLP

(57) ABSTRACT

A harness for restraining an animal comprises a harness assembly and an extension member. The harness assembly attaches to the animal and can be adjusted to conform to the size and shape of an animal to be restrained. The flexible extension member is fixed to the harness assembly and extends upwardly above the animal's back. A leash can be attached to the extension member at a point sufficiently high relative to the ground that the animal cannot step over the leash and become entangled therewith.

56 Claims, 6 Drawing Sheets

ANIMAL RESTRAINT APPARATUS WITH ELEVATED LEASH ATTACHMENT

CROSS-REFERENCE TO RELATED APPLICATIONS

This patent application claims priority under Title 35, United States Code Section 119(e) to U.S. Provisional Patent Application No. 60/328,522 entitled "Dog Collar with an Upward Extendor Arm for a Leash Attachment" filed Oct. 9, 2001 naming as sole inventor Joseph B. Hippensteel, which is incorporated by reference in its entirety and made a part hereof.

FIELD OF THE INVENTION

The present invention relates generally to restraint devices for animals, and more particularly, to a harness used to restrain a pet such as a dog or cat. The harness can be used to avoid tangling of a leash with the animal's legs.

BACKGROUND INFORMATION

Previous pet restraint devices use a collar attached with a buckling device around an animal's neck. The collar generally has an attachment mechanism such as a metal loop to which a connector of a leash can be attached to permit a person to use the leash to control the animal. Typically, the buckling device and attachment mechanism of the collar and the leash connector are composed of metal or metal alloy, and are thus relatively heavy as compared to the collar's leather or fabric strap that encircles the animal's neck. Therefore, due to the weight of the buckling device, attachment mechanism, leash connector, and leash, the collar often rotates around the animal's neck so that the leash dangles between the animal's legs. As so positioned, the leash often becomes entangled with the animal's legs. Furthermore, it is not an uncommon occurrence when handling more than one animal simultaneously that the leash becomes entangled with the legs of another animal other than the one to which the leash is attached. Not only is this circumstance a nuisance when walking a dog or other animal, it can also cause discomfort and injury to such animal. For example, if the animal suddenly darts toward an object of interest, the animal can suffer serious discomfort or injury to its throat or legs if the leash is tangled therewith. It would be desirable to overcome these disadvantages of previous pet restraint devices.

Another problem common to most previous animal collars is that the collar defines a relatively small area of contact with an animal for application of restraining force by the handler. If the animal suddenly moves, the animal can be choked or injured by the collar as the handler pulls the leash to restrain the animal. A harness can therefore be a much more effective device for humanely restraining an animal as it is secured to a larger area of the animal's body as opposed to a collar that merely attaches around an animal's neck. However, many harness restraint devices are relatively bulky and therefore can be burdensome for an animal to carry. Moreover, some harnesses are configured to undesirably impede the natural movement of the animal by blocking or obstructing movement of its legs, shoulders or other body parts. It would be desirable to overcome this disadvantage of previous animal restraining devices.

SUMMARY OF THE INVENTION

The disclosed apparatus, in its various aspects, overcomes the above-indicated disadvantages of previous animal restraint devices.

A disclosed apparatus for restraining an animal with a leash comprises a harness assembly and an extension member. The harness assembly is attachable to the animal. The extension member is coupled to the harness assembly so as to extend therefrom. The extension member provides an attachment point for the leash that is sufficiently elevated above the animal's back to prevent tangling of the leash with a leg of the animal. The harness assembly can have a collar portion for attachment about a neck of the animal, and a belt portion for attachment about the upper chest/armpit portion of the animal at a position between the front and rear legs. For example, the belt portion can encircle the animal under the pits of the front legs. The collar portion can have a connector for removably attaching the collar portion to the animal's neck. Moreover, the collar portion can have a length adjuster for adjusting the effective length of the collar portion. The belt portion has at least one connector for attaching the belt portion around the upper chest/armpit portion of the animal. The belt portion can also have one or more length adjusters for adjusting the effective length of the belt portion. The belt portion can have a first strap portion and a second girth extension strap portion. The first strap portion can have male and female attachment elements that can be joined together with female and male attachment elements, respectively, of the second strap portion. The joined male and female attachment elements can constitute respective connectors for removably attaching the belt portion to the animal. The harness assembly can comprise at least one joiner strap extending between and joining the collar and belt portions. For example, the harness assembly can comprise a first joiner strap extending along the back of the animal between the collar and belt portions and being attached thereto, and second and third joiner straps extending along respective opposite sides of the animal between the collar and belt portions and being attached thereto. The second and third joiner straps can have respective length adjusters for adjusting the effective length of the joiner straps extending between the collar and belt portions. Furthermore, one or more of the first, second, and third joiner straps can have a coupler for attaching the joiner strap to the collar portion and permitting adjustment of the effective length of the joiner strap. The extension member can a base portion having a T-configuration attached to an intersection of the belt portion with the first joiner strap. The extension member can comprise an elongated element having a first end formed integrally with the base portion of the extension member, and a second end opposite the first end, the second end having an eyelet for receiving an attachment mechanism of a leash. The extension member can be composed of a resilient material to provide a degree of flexibility in the event it is necessary to apply sudden restraining force, and/or to prevent discomfort or injury to the animal if it rolls over or lies on its back.

Details of the construction and operation of the invention are more fully hereinafter described and claimed. In the detailed description, reference is made to the accompanying drawings, forming a part of this disclosure, in which like numerals refer to like parts throughout the several views.

DESCRIPTION OF THE PREFERRED EMBODIMENTS

Definitions

"And/or" means either or both of the things preceding and succeeding the term.

"Coupled" refers to joining of two parts of the disclosed apparatus, whether directly or indirectly through one or more intermediate elements and/or coupling mechanisms.

"Effective length" refers to the adjusted length of a strap. The length of a strap is static and cannot be changed, but through the use of a device such as a length adjuster, coupler, or other device, the effective length of the strap can be changed in the disclosed harness assembly to accommodate animals of different size.

"Extension means" refers to the extension member for permitting attachment of a leash at a position above the animal's back to prevent tangling of the leash with a leg(s) of the animal.

"Harness means" refers to the harness assembly for restraining an animal.

"(s)" following a word means one or more of the things meant by that word.

General System and Method

Figure 1:
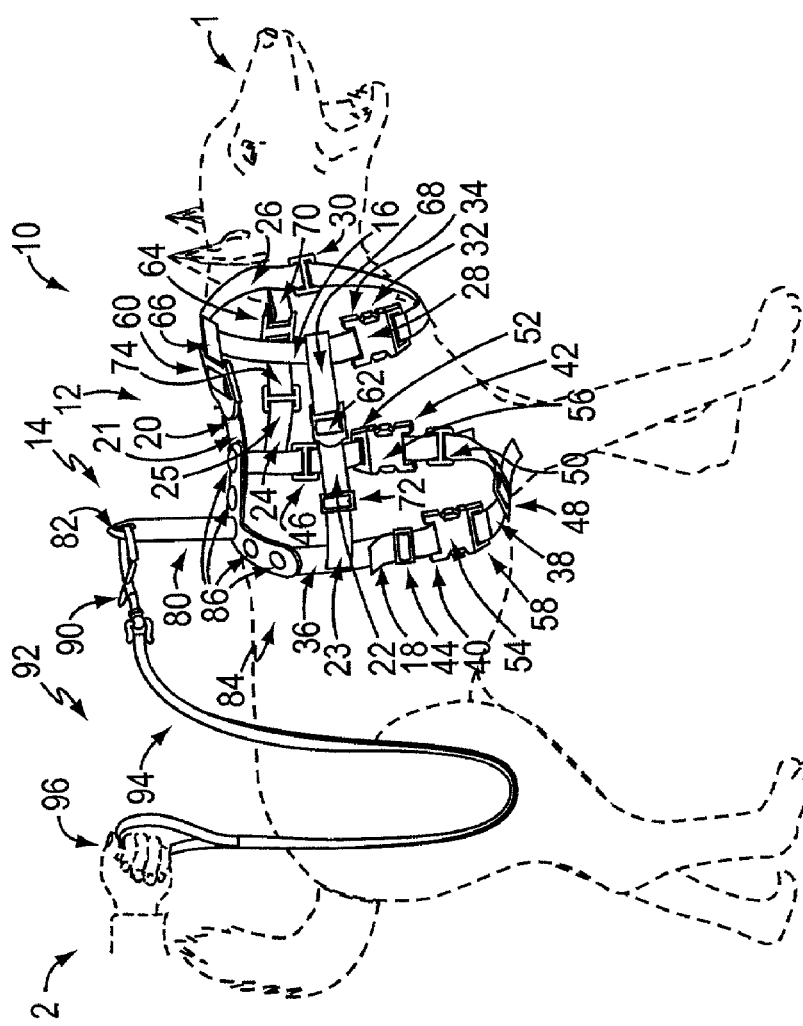
FIG. 1 is a general view of an animal restraint apparatus of the invention comprising a harness assembly and an extension member.

FIG. 1 is a view of an animal restraint apparatus 10 of the invention. The animal restraint apparatus 10 generally comprises a harness assembly 12 and an extension member 14. The harness assembly 12 is removably attachable to an animal about its neck and torso. Because it provides a relatively broad surface area in contact with the animal, the harness assembly 12 spreads restraining force applied by a person with a leash over a relatively broad area of the animal's body. The relatively large contact area provided by the harness assembly 12 thus helps to ensure that the animal will not be harmed by application of restraining force to the animal via the harness assembly.

The extension member 14 is attached to the harness assembly 12 and extends above the animal's back upon proper attachment of the animal restraint apparatus 10 to the animal. The extension member 14 permits the leash to be attached to the animal restraint apparatus 10 at a position above the animal's back. This ensures that the leash will hang from the extension member 12 at a position that is sufficiently high above the back of the animal so that the restrained animal cannot step over the leash. This avoids tangling of the leash with the animal's legs.

The harness assembly 12 comprises a collar portion 16, a belt portion 18, and joiner straps 20, 22, 24. The collar portion 16 comprises a strap 26, connector 28, and length adjuster 30. The connector 28 has male and female parts 32, 34. The female part 34 has a slot through which the strap 26 is looped and doubled-over onto itself. The doubled-over portion of the strap 26 can be sewn together with relatively heavy thread to secure the female part 34 to one end of the strap 26. The opposite end of the strap 26 is inserted through the length adjuster 30, looped through slots in the connector's male part 34, and is doubled-over and fed again through the slots of the length adjuster 30. If the length adjuster 30 is implemented as a single bar slide, then the doubled-over portion of the strap 26 is inserted over the single bar of the slide in a well-known manner. The length adjuster 30 uses friction to secure the doubled-over portion of the strap 26. The effective length of the strap 26 can be adjusted by bending and feeding the strap 26 through the length adjuster 30 to the desired length and then releasing the strap 26. The effective length of the strap 26 can thus be changed to accommodate the neck size of an animal to which the harness assembly 12 is to be attached. To attach the collar portion 16 to an animal's neck, the collar portion 16 is placed around the animal's neck and the male and female parts 32, 34 of the connector 28 are joined together. The connector 28 can be made releasable so that the collar portion can be removed from the animal. For example, the connector 28 can be a snap buckle that can be squeezed with the fingers of a hand to disengage prongs of the male part 32 from the female part 34. The connector 28 can thus be used to attach or detach the collar portion 26 from the animal's neck.

The belt portion 18 comprises a strap 36, optional girth extension strap 38, connectors 40, 42, and length adjusters 44, 46, 48, 50. The strap 36 terminates with male and female parts 52, 54 that can be joined to respective female and male parts 56, 58 forming connectors 40, 42. The connectors 40, 42 can be used to attach the belt portion 18 about the girth of the animal to be restrained. The strap 36 can be adjusted in length with respective length adjusters 44, 46. The strap 36 has ends inserted through respective slots of the length adjusters 44, 46 and further through respective male and female parts 52, 54 that are then doubled over and inserted through respective length adjusters 44, 46. By bending portions of the strap 36 extending through the length adjusters 44, 46 and feeding the strap 36 through the length adjusters 44, 46 and releasing the strap 36, the effective length of the strap 36 can be adjusted to accommodate the girth of an animal to which the belt portion 18 is to be attached. Furthermore, by providing length adjusters 44, 46 on opposite sides of the animal, the belt portion 18 can be by a person positioned on either side of the animal. This feature makes the animal restraint apparatus 10 relatively easy for the person to adjust for the animal. Similarly, the strap 38 has ends fed through respective length adjusters 48, 50 and looped through slots defined in the female and male parts 56, 58. The strap 38 is doubled over onto itself and its ends fed back through the slots of length adjusters 48, 50. The strap 38 can be adjusted by bending portions the strap 38 at the length adjusters 48, 50, feeding through the strap 38 to adjust the effective length of the strap 38 to the desired length, and releasing the portions of the length adjusters 48, 50 so that friction applied by the length adjusters 48, 50 prohibits sliding of the strap 38 to fix its effective length. The effective length of the strap 38 can thus be adjusted by the length adjusters 48, 50. Thus, the length adjusters 44, 46, 48, 50 provide the ability to adjust the circumference of the belt portion 18 to accommodate animals of different size.

The joiner straps 20, 22, 24 extend between and have respective ends secured to the collar and belt portions 16, 18 to form the integrated harness assembly 12. The joiner straps 20, 22, 24 comprise strap segments 21, 23, 25, couplers 60, 62, 64, and strap loops 66, 68, 70. The joiner straps 22, 24 further comprise length adjusters 72, 74. The strap segments 21, 23, 25 have respective ends attached to the belt portion 18. Such ends can be attached to the belt portion 18 by stitching with a relatively heavy thread, for example. The straps 23, 25 are threaded through slots in respective length adjusters 66, 68. The straps 21, 23, 25 further are threaded through couplers 60, 62, 64. The straps 23, 25 are doubled over and fed back through the length adjusters 72, 74 and threaded through such adjusters in a well-known manner. The opposite ends of couplers 60, 62, 64 are secured to the collar portion 16 with loop straps 66, 68, 70 that are threaded through such couplers and are doubled over so as to overlap and form a loop extending through the couplers. The doubled-over portions of the loop straps 66, 68, 70 are fixed to the collar portion. The loop straps 66, 68, 70 can be fixed to the collar portion 16 by stitching with a relatively heavy thread or the like.

It should be appreciated that the configuration of the harness assembly 12 permits free movement of the animal's front legs and shoulders. Thus, the animal restraint apparatus 10 can be attached to the animal in a manner that will not impede the animal's free movement and possibly cause the animal discomfort or injury.

The extension member 14 comprises an extension portion 80 defining an eyelet 82, and a base portion 84. The base portion 84 can have a T-like configuration aligned with and overlying the intersecting area of the strap segment 21 of the joiner strap 20 and the strap 36 of the belt portion 18. The base portion 84 can be joined to the strap portions 21, 36 with rivets 86. More specifically, the base of the extension member 14 defines holes to receive rivets 86 to secure the extension member 14 to the harness assembly 12. The extension portion 18 can be formed integrally with the base portion 84, and can extend upwardly to a distance of ten (10) to thirty (30) centimeters, for example. The extension portion 18 can be made to extend as high above the animal's back as necessary for the length of the leash 92 so that the animal cannot step over the leash and become entangled therewith. The extension portion 18 defines an eyelet 82 at the end opposite the base portion 84 to receive the attachment mechanism 90 of leash 92. The attachment mechanism 90 is coupled to lead 94 of the leash. The end of the leash 92 opposite the attachment mechanism 90 may have a loop 96 or the like to permit the person 2 handling the animal 1 to secure the leash in hand. The exact configuration of the leash 94 is not generally important to the disclosed animal restraint apparatus 10 so long as it can be attached to the extension member 14.

Figure 2:
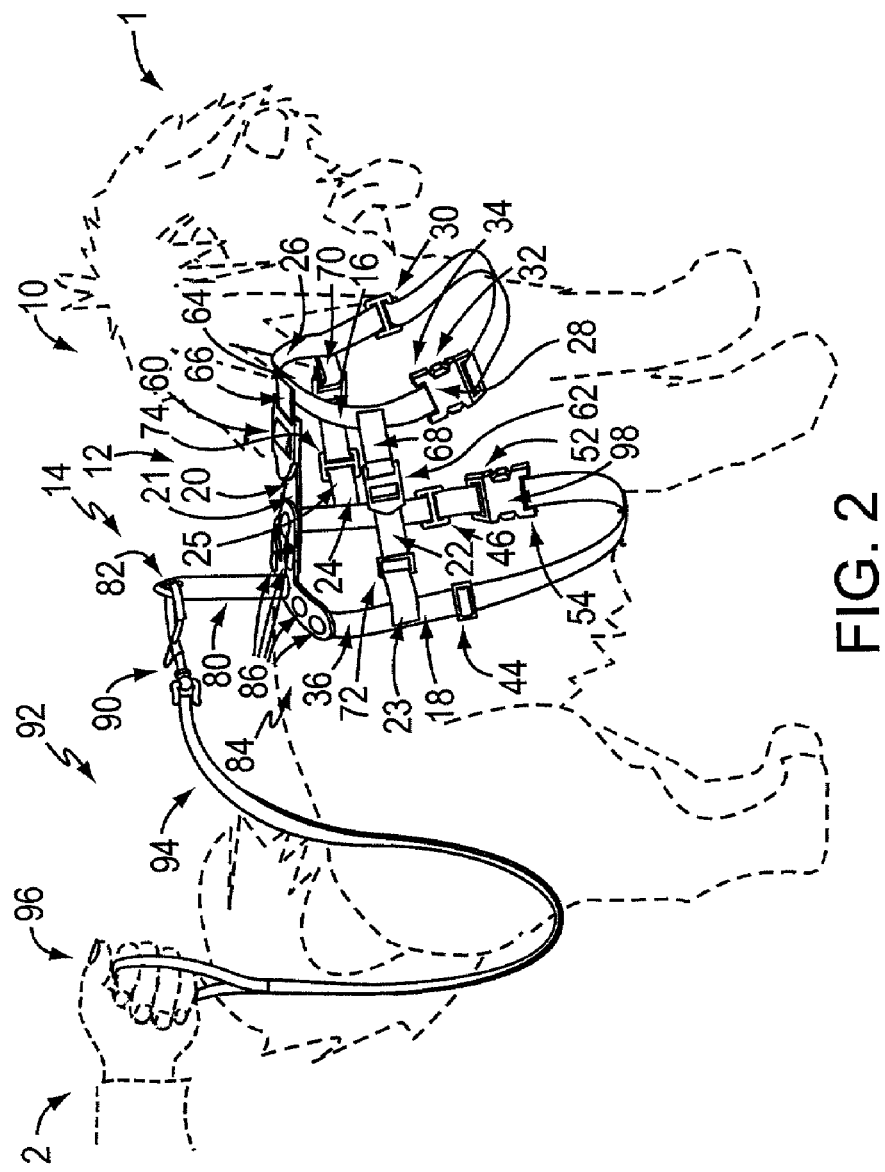
FIG. 2 is a general view of an animal restraint apparatus adapted to be secured to animals of relatively small girth.

FIG. 2 demonstrates that the animal restraint apparatus 10 can be adjusted to accommodate animals of different sizes. The animal restraint apparatus 10 is adjusted with the length adjusters 30, 44, 46, 72, 74 to accommodate the size of the animal shown in FIG. 2. For the animal shown in FIG. 2, the extension strap 38 is not used, and the male part 52 is joined directly to female part 54 to accommodate the relatively small girth of the animal. FIG. 2 thus demonstrates the versatility of the animal restraint apparatus 10 to accommodate animals of different size.

The length adjusters 30, 44, 46, 48, 50, 72, 74 can be composed of single bar slides. The connectors 28, 40, 42, 98 can be a slide release buckle or snap buckle. The couplers 60, 62, 64 can comprise double bar buckles or tension locks. The length adjusters 30, 44, 46, 48, 50, 72, 74, connectors 28, 40, 42, 98, and couplers 60, 62, 64 can be composed of plastic material such as polyvinyl chloride (PVC), polycarbonate, metal, metal alloy, or other durable rigid material. Such material can be injection molded, cast, stamped, cut, and/or machined from a block of material, for example. The straps 21, 23, 25, 26, 36, 38 and strap loops 66, 68, 70 can be composed of an elongated flexible material with woven or braided fibers such as cotton, polyester, polypropylene, nylon, linen, rayon, jute, acrylic, hemp, wool and leather. Alternatively, the strap 26 can be composed of a solid or integral piece of material, such as a strip of extruded plastic or leather, for example. The straps can be cut to length, hemmed, and stitched together with heavy thread or monofilament to form the harness assembly 12. The extension member 14 can be composed of rubber or a resilient plastic material. This resiliency of the extension member 14 provides a degree of absorption of shock in the event that the animal moves suddenly against restraining force applied by the leash 92. In addition, such resiliency prevents discomfort or injury to the animal if the animal rolls over or lies on its back. The base of the extension member 14 defines holes to receive rivets 86 to secure the extension member 14 to the harness assembly 12. The rivets 86 can be composed of plastic, metal, metal alloy, or other durable rigid material. Alternatively, or in addition, the extension member 14 can be secured to the harness assembly 12 with an adhesive substance such as epoxy, rubber cement, or other adhesive.

Figure 3:
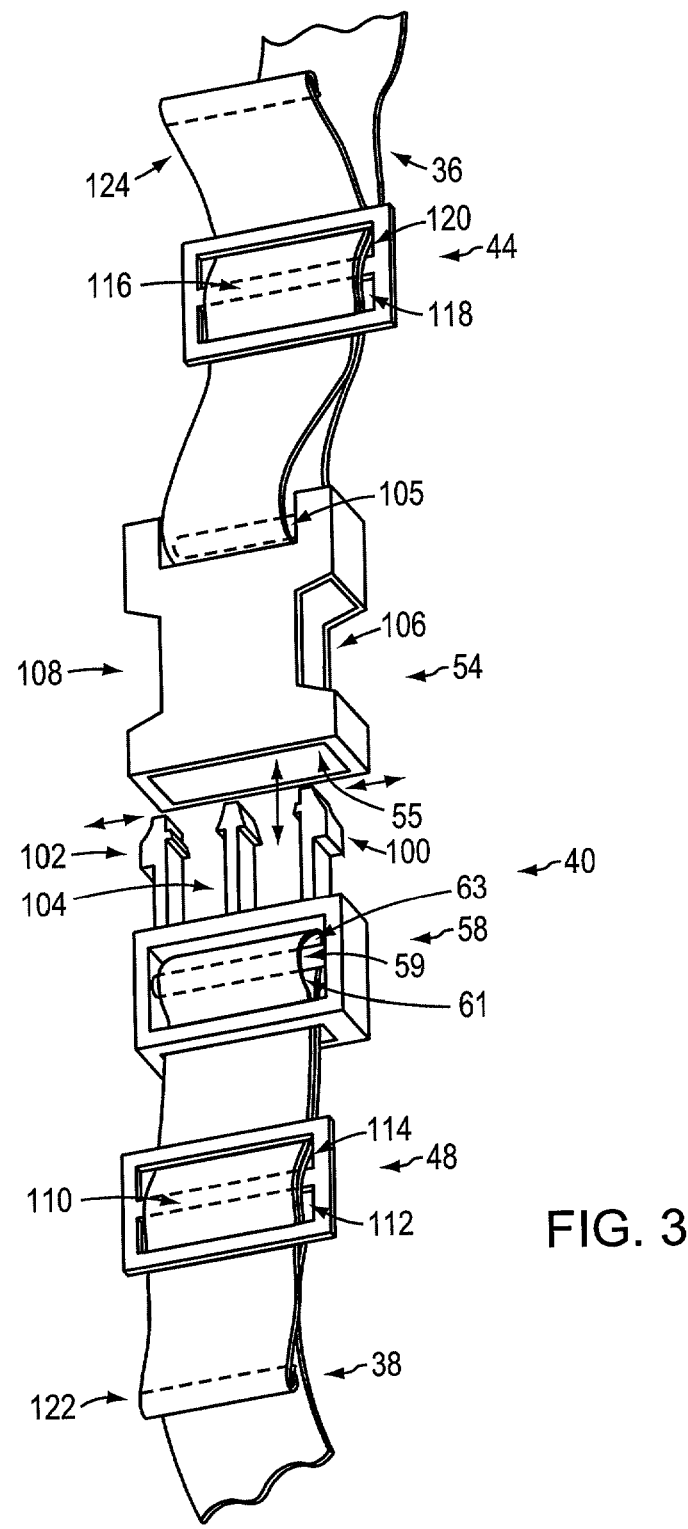
FIG. 3 is a detailed view of a portion of the animal restraint apparatus including a joiner strap, a connector, and a length adjuster of the harness assembly.

FIG. 3 is a relatively detailed view of a possible implementation of a portion of the harness assembly 12 including straps 36, 38, connector 40, and length adjusters 44, 48. The strap 38 is fed through slots 112, 114 of the length adjuster 48 over the bar 110. The strap 38 is further fed through the slots 61, 63 over the bar 59 and back through the slots 112, 114 over the bar 110 of the length adjuster 48. The end of the strap 38 can be folded back on itself one or more times and fixed together by sewing with a heavy thread or monofilament to form a relatively thick arrester 122. The arrester 122 can be made thicker than the width of slot 112 to prevent the strap 122 from slipping out of engagement with the length adjuster 48 and/or male part 58 of connector 40. The male part 58 is configured with three prongs 100, 102, 104. The outer prongs 100, 102 are resilient and have angled outer surfaces that cause the prongs to bend inwardly toward one another upon insertion into the opening 55 defined in the female part 54. The outer surfaces of the prongs 100, 102 also define hooks that snap into engagement in side openings 106, 108 defined in the female part 54 upon joining the female and male parts 54, 58 together. To release the female and male parts 54, 58 of the connector 40, the outer prongs 100, 102 can be squeezed together with the fingers of a hand at the openings 106, 108 so that their hooked portions clear the edges of the female part 54 defining openings 106, 108. This action permits the male part 58 to be extracted from the female part 54. The central prong 104 engages with inner surfaces of the female part 54 and stabilizes the connector 40 so that the female and male parts 54, 58 fit tightly together and do not wobble significantly upon application of torque to the connector 40. The end of the strap 36 is looped through slots 118, 120 over bar 116 of the slider 44 and through the slot 105 defined at an end of the female part 54. The end of the strap 36 is further looped back through the slots 118, 120 over bar 116 of the length adjuster 44. The terminal end of the strap 36 can be rolled or doubled-over one or more times and sewn together with thread or monofilament to form an arrester 124. The arrester 124 prevents the end of strap 36 from slipping through the length adjuster 44 and/or female part 54 so that the strap remains secured to these parts. The length adjusters 30, 46, 50, 72, 74 and connectors 28, 42, 98 can be structured and function similarly to straps 36, 38, connector 40, and length adjusters 44, 48 as described with respect to FIG. 3.

Figure 4:
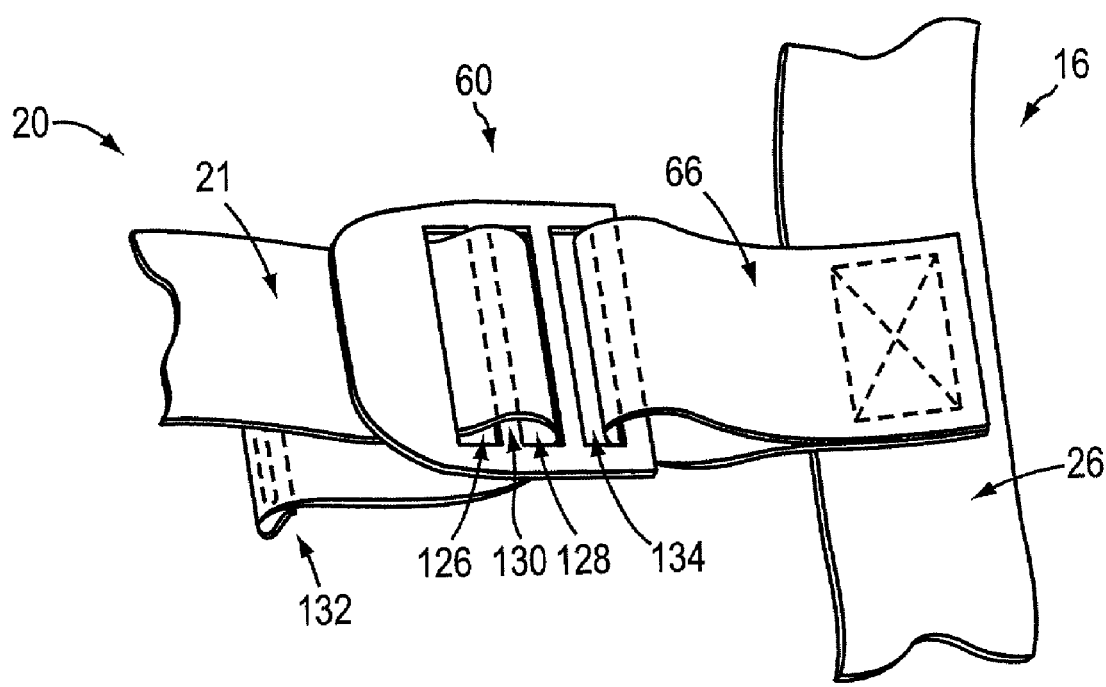
FIG. 4 is a detailed view of a portion of the animal restraint apparatus including a joiner strap and collar portion of the harness assembly.

FIG. 4 is a relatively detailed view of a portion of the strap segment 21, coupler 60, and loop 66 and the strap 26 of the collar portion 16 of the harness assembly 12. An end of the strap segment 21 is inserted through slots 126, 128 of the coupler 60 over the bar 130. The end of the strap segment 21 is rolled or folded over onto itself one or more times and is secured together with thread or monofilament stitching to form an arrester 132. The arrester 132 is wider than the slot 126 and thus prohibits the end of the strap 132 from becoming disengaged from the coupler 60. The loop 66 is inserted through the slot 134 defined in the coupler 60, and is fixed to the strap 26 of the collar portion 16 by thread or monofilament stitching to secure the coupler 60 to the collar portion 16.

Figure 5:
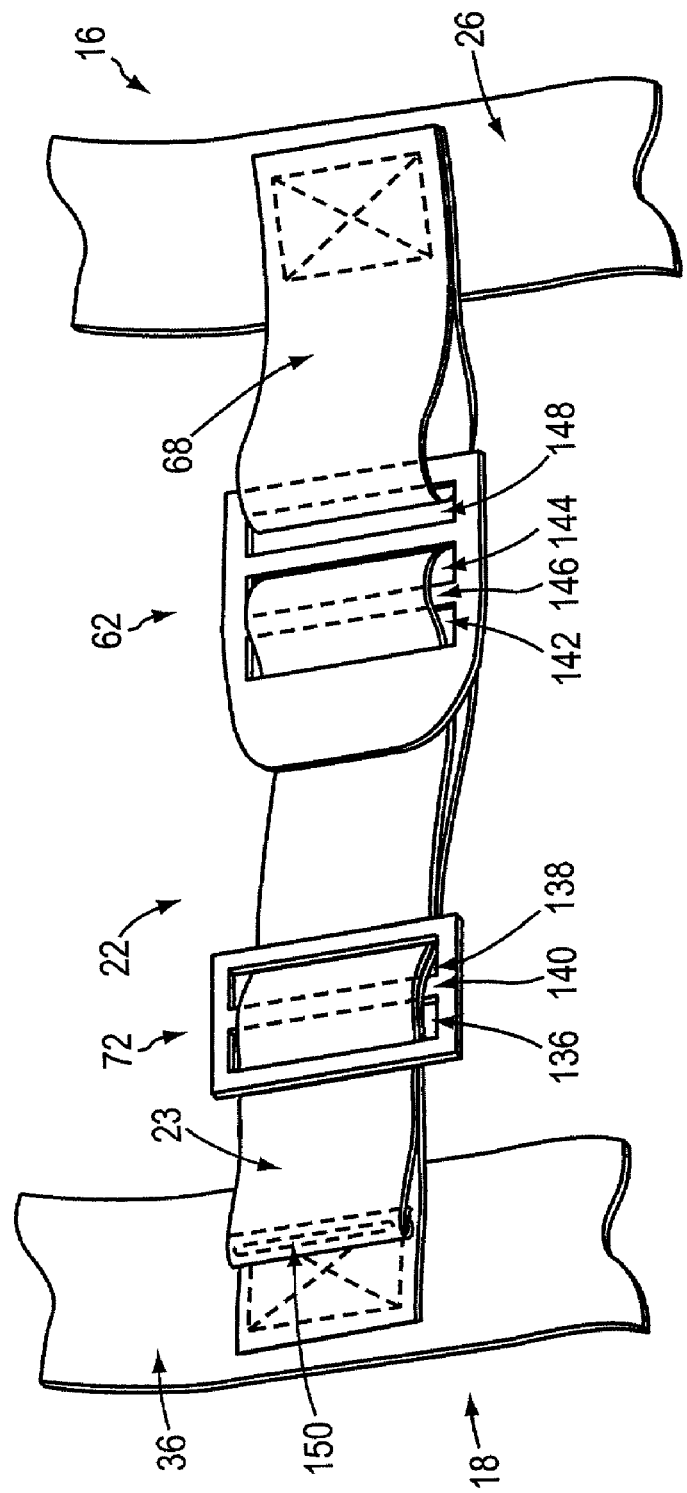
FIG. 5 is a relatively detailed view of a portion of the animal restraint apparatus comprising collar portion, belt portion, and joiner strap of the harness assembly.

FIG. 5 is a relatively detailed view of the joiner strap 22 having opposite ends secured to the collar and belt portions 16, 18, respectively. The strap segment 23 of the joiner strap 22 has an end attached by thread or monofilament stitching to the strap 36 of the belt portion 18. The strap segment 23 extends through slots 136, 138 over bar 140 of length adjuster 72. The end of the strap segment 23 is further fed through the slots 142, 144 over bar 146 of the coupler 62 and is doubled over itself back through the slots 136, 138 over bar 140 of the length adjuster 72. The end of the strap segment 23 can be rolled or folded upon itself and sewn together with thread or monofilament stitching to form an arrester 150. The arrester 150 prevents the end of the strap segment 23 from slipping through the length adjuster 72. The loop 68 extends through the slot 148 defined in the coupler 62 and is fixed by thread or monofilament to the strap 26 of the collar portion 16. The joiner strap 24 can be configured similarly to the joiner strap 22 shown in FIG. 5.

Figure 6:
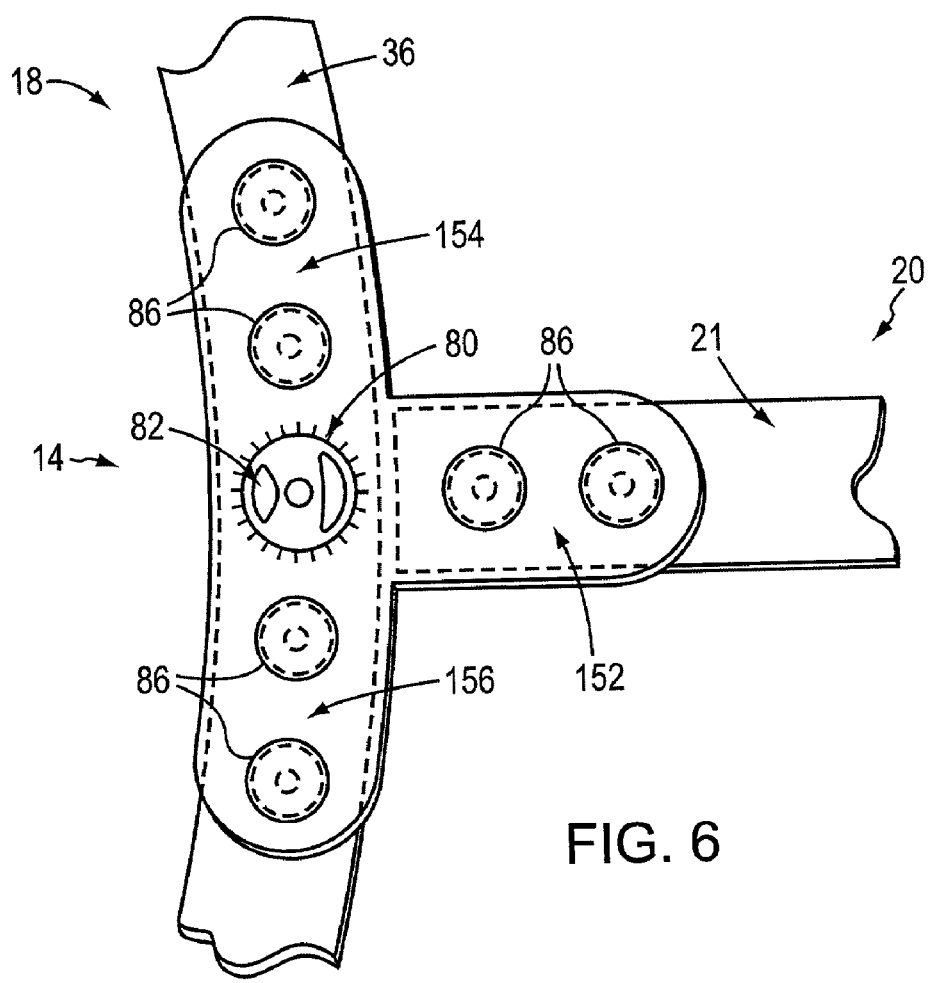
FIG. 6 is a relatively detailed view of a portion of the harness assembly and the extension member.

FIG. 6 is a relatively detailed view of the extension member 14 and portions of the strap 36 of the belt portion 18 and the strap segment 21 of the joiner strap 20. Legs 152, 154, 156 forming the T-shaped base portion 14 extend along and overlie the strap segment 21 of the joiner strap 20 and the strap 36 of the belt portion 18 and are fixed to such straps with the rivets 86 extending through holes in the legs and straps. The extension member 80 protrudes upwardly from the base portion 14 and defines eyelet 82 to receive the attachment mechanism 90 of the leash 92.

To use the device 10, the handler 2 lays the harness on the back on the animal to be restrained and secures the collar portion 16 around the animal's neck by joining parts 32, 34 of the connector 28. If necessary, the length adjuster 30 can be used to change the effective length of the collar portion 16 so that it is secure to the animal's neck without causing discomfort to the animal. The effective length of the collar portion 16 can be adjusted by bending the strap 26 at the length adjuster 30, feeding the strap 26 through such length adjuster to the desired effective length, and releasing the strap 26. The belt portion 18 is further attached about the animal's upper chest/armpit area. If the animal has a relatively large girth, then the extension strap 38 can be used by joining the parts 52, 54 to respective parts 56, 58 of the extension strap 38. Alternatively, for animals with smaller upper chest/armpit areas, the extension strap 38 can be omitted, and the part 52 joined directly with the part 54 to form the connector 98, as shown in FIG. 2. Length adjustment for the belt portion 18 can be made using adjusters 44, 46, 48, 50 in a well-known manner by bending corresponding straps 36, 38 at the adjusters, sliding such straps through the adjusters 44 to the desired length, and releasing such straps. For the joiner portions 22, 24, length adjustment can be for adjusters 66, 68 to control separation of the collar portion 16 and the belt portion 18. Couplers 60, 62, 64, if implemented as double bar buckles or tension locks, for example, can also be used to adjust the effective lengths of the joiner straps 20, 22, 24 by feeding the strap segments 21, 23, 25 through slots defining a bar in such couplers and pulling the strap segments tight so that the couplers 60, 62, 64 lock the strap segments at a particular effective length. The harness assembly 12 can be thus secured to the animal 1. The handler 2 then attaches the leash 92 to the eyelet 82 of the extension member 14 and secures the leash in hand to restrain the animal. In walking the animal such as dog, for example, the handler 2 and dog can proceed together. Because the extension member 82 elevates the lowest point to which the leash hangs to a position at which the animal cannot step over the leash, the leash does not become entangled in the dog's legs. This feature greatly facilitates activities such as exercising or walking an animal such as a pet as the handler an animal do not have to stop so that the handler can disentangle the leash from the animal's leg. Further, the animal is thus much less likely to suffer discomfort or injury that could otherwise occur if the leash is entangled in the animal's legs when the handler applies restraining force via the leash. For example, if the animal bolts after an object of interest with the leash entangled in the animal's legs, it is very possible that the animal will suffer discomfort or injury. The disclosed animal restraint apparatus 10 overcomes this disadvantage of previous animal restraint devices.

It should be appreciated that numerous modifications to the disclosed apparatus are possible without departing from the scope of the invention. For example, although the connectors 28, 40, 42, 98 are shown as snap buckles, they could be other mechanical devices such as clamps, clips, etc. to hold the ends of the attached straps together in a releasable manner, although use of the length adjusters 30, 44, 46, 48, couplers 60, 62, 64 and loop straps 66, 68, 70 may be preferred in many instances, some or all of these elements can be omitted and the ends of straps 21, 23, 25, 26, 32, 34, 36, 38 can be coupled directly to respective connector parts 52, 54, 56, 58 and straps. In this case, the respective ends of straps 21, 23, 25 can be coupled directly to straps 26, 36, and straps 26, 36, 38 can have ends attached to respective connector parts 52, 54, 56, 58. It should be understood that while FIGS. 1 and 2 show the apparatus 10 applied to restraining a dog, the apparatus can be adjusted for use to restrain other species of four-legged animals whether domesticated or wild.

The many features and advantages of the present invention are apparent from the detailed specification and thus, it is intended by the appended claims to cover all such features and advantages of the described apparatuses which follow in the true spirit and scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the scope of the invention.

What is claimed is:

1. An apparatus for restraining an animal with a leash, the apparatus comprising:
   a harness assembly attachable to the animal; and
   a vertically-extending extension member coupled to the harness assembly, the extension member comprising flexible self-supporting elastomeric material which springs back to resume a former shape after being stretched or compressed and provides support for the extension member to extend vertically, linearly upwardly from the animal's back the extension member having an eyelet structure located at its distal end that provides an attachment point for the leash that is sufficiently elevated above the animal's back when in use to prevent tangling of the leash with a leg of the animal.

2. An apparatus as claimed in claim 1 wherein the harness has a collar portion for attachment about a neck of the animal, and a belt portion for attachment about the upper chest/armpit portion of the animal at a position between the front and rear legs.

3. An apparatus as claimed in claim 2 wherein the collar portion has a connector for removably attaching the collar portion to the animal's neck.

4. An apparatus as claimed in claim 2 wherein the collar portion has a length adjuster for adjusting the effective length of the collar portion.

5. An apparatus as claimed in claim 2 wherein the belt portion has at least one connector for attaching the belt portion around the upper chest/armpit portion of the animal.

6. An apparatus as claimed in claim 2 wherein the belt portion has at least one length adjuster for adjusting the effective length of the belt portion.

7. An apparatus as claimed in claim 2 wherein the belt portion has a first strap portion and a second girth extension strap portion, the first strap portion having male and female attachment elements that can be joined together with female and male attachment elements, respectively, of the second strap portion, the joined male and female attachment elements constituting respective connectors for removably attaching the belt portion to the animal.

8. An apparatus as claimed in claim 2 wherein the harness comprises at least one joiner strap extending between and joining the collar and belt portions.

9. An apparatus as claimed in claim 2 wherein the harness comprises a first joiner strap extending along the back of the animal between the collar and belt portions and being attached thereto, and second and third joiner straps extending along respective opposite sides of the animal between the collar and belt portions and being attached thereto.

10. An apparatus as claimed in claim 9 wherein at least the second, and third joiner straps have respective length adjusters for adjusting the effective length of the joiner straps extending between the collar and belt portions.

11. An apparatus as claimed in claim 9 wherein at least one of the first, second, and third joiner straps has a coupler for attaching the joiner strap to the collar portion and permitting adjustment of the effective length of the joiner strap.

12. An apparatus as claimed in claim 9 wherein the extension member comprises a base portion having a T-configuration attached to an intersection of the belt portion with the first joiner strap.

13. An apparatus as claimed in claim 12 wherein the extension member comprises an elongated element having a first end formed integrally with the base portion of the extension member, and a second end opposite the first end, the second end having an eyelet for receiving a coupler of a leash.

14. An apparatus as claimed in claim 1 wherein the extension member comprises an elongated element having a base member, the base member attached to the harness portion, the elongated element having a first end formed integrally with the base portion of the extension member, and a second end opposite the first end, the second end having an eyelet for receiving an attachment mechanism of the leash.

15. An apparatus for restraining an animal with a leash, the apparatus comprising:
    harness means for restraining an animal;
    vertically-extending extension member means coupled to the harness means, the extension member means comprising flexible self-supporting elastomeric material which springs back to resume a former shape after being streched or compressed and provides support for the extension member to extend vertically, linearly upwardly from the animal's back the extension member means having an eyelet structure located at its distal end that provides an attachment point for the leash that is sufficiently elevated above the animal's back when in use to prevent tangling of the leash with a leg of the animal.

16. An apparatus as claimed in claim 15 wherein the harness means has a collar portion for attachment about a neck of the animal, and a belt portion for attachment about the upper chest/armpit portion of the animal at a position between the front and rear legs.

17. An apparatus as claimed in claim 16 wherein the collar portion has a connector for removably attaching the collar portion to the animal's neck.

18. An apparatus as claimed in claim 16 wherein the collar portion has a length adjuster for adjusting the effective length of the collar portion.

19. An apparatus as claimed in claim 16 wherein the belt portion has at least one snap buckle for attaching the belt portion around the upper chest/armpit portion of the animal.

20. An apparatus as claimed in claim 16 wherein the belt portion has at least one length adjuster for adjusting the effective length of the belt portion.

21. An apparatus as claimed in claim 16 wherein the belt portion has a first strap portion and a second girth extension strap portion, the first strap portion having male and female attachment elements that can be joined together with female and male attachment elements, respectively, of the second strap portion, the joined male and female attachment elements constituting respective connectors for removably attaching the belt portion to the animal.

22. An apparatus as claimed in claim 15 wherein the harness means comprises at least one joiner strap extending between and joining the collar and belt portions.

23. An apparatus as claimed in claim 15 wherein the harness means comprises a first joiner strap extending along the back of the animal between the collar and belt portions and being attached thereto, and second and third joiner straps extending along respective opposite sides of the animal between the collar and belt portions and being attached thereto.

24. An apparatus as claimed in claim 23 wherein the first, second, and third joiner straps have respective length adjusters for adjusting the effective lengths of the joiner straps extending between the collar and belt portions.

25. An apparatus as claimed in claim 23 wherein at least one of the first, second, and third joiner straps has a coupler for attaching the joiner strap to the collar portion and permitting adjustment of the effective length of the joiner strap.

26. An apparatus as claimed in claim 23 wherein the extension member comprises a base portion having a T-configuration attached to an intersection of the belt portion with the first joiner strap.

27. An apparatus as claimed in claim 26 wherein the extension member comprises an elongated element having a first end attached to the base portion of the extension member, and a second end opposite the first end, the second end having an eyelet for receiving an coupler of a leash.

28. An apparatus as claimed in claim 15 wherein the extension member comprises an elongated element and a base member, the base member attached to the harness portion, the elongated element having a first end attached to the base portion of the extension member, and a second end opposite the first end, the second end having an eyelet for receiving a coupler of the leash.

29. An apparatus for restraining an animal with a leash, the apparatus comprising:
   a harness assembly attachable to the animal; and
   a vertically extending extension member coupled to the harness assembly so as to extend therefrom, the extension member comprising flexible self-supporting elastomeric material which springs back to resume a former shape after being stretched or compressed and provides support for the extension member to extend vertically, linearly upwardly from the animal's back the extension member having an eyelet structure located at its distal end that provides an attachment point for the leash elevated at least ten (10) centimeters above the animal's back when in use to prevent tangling of the leash with a leg of the animal.

30. An apparatus as claimed in claim 29 wherein the harness has a collar portion for attachment about a neck of the animal, and a belt portion for attachment about the upper chest/armpit portion of the animal at a position between the front and rear legs.

31. An apparatus as claimed in claim 30 wherein the collar portion has a connector for removably attaching the collar portion to the animal's neck.

32. An apparatus as claimed in claim 30 wherein the collar portion has a length adjuster for adjusting the effective length of the collar portion.

33. An apparatus as claimed in claim 30 wherein the belt portion has at least one connector for attaching the belt portion around the upper chest/armpit portion of the animal.

34. An apparatus as claimed in claim 30 wherein the belt portion has at least one length adjuster for adjusting the effective length of the belt portion.

35. An apparatus as claimed in claim 30 wherein the belt portion has a first strap portion and a second girth extension strap portion, the first strap portion having male and female attachment elements that can be joined together with female and male attachment elements, respectively, of the second strap portion, the joined male and female attachment elements constituting respective connectors for removably attaching the belt portion to the animal.

36. An apparatus as claimed in claim 30 wherein the harness comprises at least one joiner strap extending between and joining the collar and belt portions.

37. An apparatus as claimed in claim 30 wherein the harness comprises a first joiner strap extending along the back of the animal between the collar and belt portions and being attached thereto, and second and third joiner straps extending along respective opposite sides of the animal between the collar and belt portions and being attached thereto.

38. An apparatus as claimed in claim 37 wherein at least the second, and third joiner straps have respective length adjusters for adjusting the effective length of the joiner straps extending between the collar and belt portions.

39. An apparatus as claimed in claim 37 wherein at least one of the first, second, and third joiner straps has a coupler for attaching the joiner strap to the collar portion and permitting adjustment of the effective length of the joiner strap.

40. An apparatus as claimed in claim 37 wherein the extension member comprises a base portion having a T-configuration attached to an intersection of the belt portion with the first joiner strap.

41. An apparatus as claimed in claim 40 wherein the extension member comprises an elongated element having a first end formed integrally with the base portion of the extension member, and a second end opposite the first end, the second end having an eyelet for receiving a coupler of a leash.

42. An apparatus as claimed in claim 29 wherein the extension member comprises an elongated element and a base member, the base member attached to the harness portion, the elongated element having a first end formed integrally with the base portion of the extension member, and a second end opposite the first end, the second end having an eyelet for receiving an attachment mechanism of the leash.

43. An apparatus for restraining an animal with a leash, the apparatus comprising:
   harness means for restraining an animal;
   vertically-extending extension member means coupled to the harness means, the extension member means comprising flexible self-supporting elastomeric material which springs back to resume a former shape after being stretched or compressed and providing support for the extension member to extend vertically, linearly upward from the animal's back the extension member means having an eyelet structure located at its distal end that provides an attachment point for the leash at a position elevated at least ten (10) centimeters above the animal's back when in use to prevent tangling of the leash with a leg of the animal.

44. An apparatus as claimed in claim 43 wherein the harness means has a collar portion for attachment about a neck of the animal, and a belt portion for attachment about the upper chest/armpit portion of the animal at a position between the front and rear legs.

45. An apparatus as claimed in claim 44 wherein the collar portion has a connector for removably attaching the collar portion to the animal's neck.

46. An apparatus as claimed in claim 44 wherein the collar portion has a length adjuster for adjusting the effective length of the collar portion.

47. An apparatus as claimed in claim 44 wherein the belt portion has at least one snap buckle for attaching the belt portion around the upper chest/armpit portion of the animal.

48. An apparatus as claimed in claim 44 wherein the belt portion has at least one length adjuster for adjusting the effective length of the belt portion.

49. An apparatus as claimed in claim 44 wherein the belt portion has a first strap portion and a second girth extension strap portion, the first strap portion having male and female attachment elements that can be joined together with female and male attachmmt elements, respectively, of the second strap portion, the joined male and female attachment elements constituting respective connectors for removably attaching the belt portion to the animal.

50. An apparatus as claimed in claim 43 wherein the harness means comprises at least one joiner strap extending between and joining the collar and belt portions.

51. An apparatus as claimed in claim 43 wherein the harness means comprises a first joiner strap extending along the back of the animal between the collar and belt portions and being attached thereto, and second and third joiner straps extending along respective opposite sides of the animal between the collar and belt portions and being attached thereto.

52. An apparatus as claimed in claim 51 wherein the first, second, and third joiner straps have respective length adjusters for adjusting the effective lengths of the joiner straps extending between the collar and belt portions.

53. An apparatus as claimed in claim 51 wherein at least one of the first, second, and third joiner straps has a coupler for attaching the joiner strap to the collar portion and permitting adjustment of the effective length of the joiner strap.

54. An apparatus as claimed in claim 51 wherein the extension member comprises a base portion having a T-contiguration attached to an intersection of the belt portion with the first joiner strap.

55. An apparatus as claimed in claim 54 wherein the extension member comprises an elongated element having a first end attached to the base portion of the extension member, and a second end opposite the first end, the second end having an eyelet for receiving an coupler of a leash.

56. An apparatus as claimed in claim 43 wherein the extension member comprises an elongated element and a base member, the base member attached to the harness portion, the elongated element having a first end attached to the base portion of the extension member, and a second end opposite the first end, the second end having an eyelet for receiving an coupler of the leash.

* * * * *